(12) United States Patent
Voigt et al.

(10) Patent No.: US 12,188,191 B2
(45) Date of Patent: Jan. 7, 2025

(54) MODULAR BOOM FOR SURFACE DEICING WITH BRINE

(71) Applicant: THE TORO COMPANY, Bloomington, MN (US)

(72) Inventors: David Voigt, Le Center, MN (US); Jordan Smith, Madison Lake, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 18/598,956

(22) Filed: Mar. 7, 2024

(65) Prior Publication Data

US 2024/0209580 A1    Jun. 27, 2024

Related U.S. Application Data

(63) Continuation of application No. 17/358,916, filed on Jun. 25, 2021, now Pat. No. 11,926,978.

(51) Int. Cl.
*E01H 10/00* (2006.01)
*B60P 3/30* (2006.01)

(52) U.S. Cl.
CPC .............. *E01H 10/007* (2013.01); *B60P 3/30* (2013.01)

(58) Field of Classification Search
CPC . E01H 10/007; B60P 3/30; B05B 1/20; B05B 1/202; B05B 1/205; E01C 19/176;
(Continued)

(56) References Cited

U.S. PATENT DOCUMENTS

| 2,659,624 A | 11/1953 | Harz |
| 3,512,714 A * | 5/1970 | Phelps et al. ....... A01M 7/0064 239/168 |

(Continued)

FOREIGN PATENT DOCUMENTS

| EP | 1468605 A1 | 10/2004 |
| EP | 2022329 A2 | 2/2009 |
| KR | 10-1337362 | 12/2013 |

OTHER PUBLICATIONS

YouTube, "VSI New Liquid De-Icing Boom Testing". Retrieved from the Internet at: <https://www.youtube.com/watch?v=fXTGzlhWVxY&t=749s> on Aug. 31, 2018.

(Continued)

*Primary Examiner* — Darren W Gorman
(74) *Attorney, Agent, or Firm* — MARSHALL, GERSTEIN & BORUN LLP

(57) ABSTRACT

A modular boom for attaching to a prime mover and configured to dispense a solution to remove snow and deice a surface. The boom includes a boom shroud having a main body extending from a first end to a second end. The main body of the boom shroud has a substantially wedge shaped portion with an edge configured to engage a snow pile or windrow of snow and cause snow to flow about the wedge shaped portion. The boom shroud includes an opening in a bottom of the main body that provides access to an interior cavity. The modular boom includes a boom pipe positioned within the interior cavity of the boom shroud and has ends that extend beyond the boom shroud. The boom pipe having spaced apart apertures along the length configured to dispense the solution onto the surface. The modular boom also includes first and second end caps configured to support the (Continued)

end of the boom pipe and to connect to the first and second ends of the boom shroud to provide structural rigidity to the modular boom.

17 Claims, 7 Drawing Sheets

(58) Field of Classification Search
CPC .... A01M 7/005; A01M 7/0053; A01M 7/006; A01M 7/0064; A01M 7/0071; A01C 23/00; A01C 23/047
See application file for complete search history.

(56) References Cited

U.S. PATENT DOCUMENTS

| | | |
|---|---|---|
| 4,161,280 A | 7/1979 | Kasinskas |
| 5,012,608 A | 5/1991 | Brown |
| 5,549,457 A * | 8/1996 | Flores et al. .......... E01C 19/176 404/84.05 |
| 5,837,446 A | 11/1998 | Cozzette et al. |
| 5,899,496 A | 5/1999 | Muraro |
| 5,957,621 A * | 9/1999 | Clark, Jr. et al. ..... E01C 19/174 404/101 |
| 5,964,410 A | 10/1999 | Brown et al. |
| 7,108,196 B2 | 9/2006 | Kime |
| 7,185,449 B2 | 3/2007 | Kime |
| 10,076,759 B1 | 9/2018 | Christian |
| 10,085,437 B2 | 10/2018 | Mariani et al. |
| 11,926,978 B2 | 3/2024 | Voigt et al. |
| 2014/0263690 A1 | 9/2014 | Eckman |
| 2017/0216871 A1 | 8/2017 | Klemp, Jr. et al. |
| 2019/0255539 A1 | 8/2019 | Muscat |

OTHER PUBLICATIONS

YouTube, "L8000 De Icing Test Truck". Retrieved from the Internet at: <https://www.youtube.com/watch?v=GbHcp9mWUhQ> on Mar. 4, 2019.

* cited by examiner

MODULAR BOOM FOR SURFACE DEICING WITH BRINE

CROSS-REFERENCE TO RELATED APPLICATIONS

This application is a continuation of U.S. patent application Ser. No. 17/358,916, filed on Jun. 25, 2021, issued Mar. 12, 2024 as U.S. Pat. No. 11,926,978, the disclosure of which is hereby incorporated by reference herein in its entirety.

RELATED APPLICATION

The present application is related to control and operation of deicing systems, such as the control and operation disclosed in commonly owned and co-pending U.S. patent application entitled "CONTROL AND OPERATION OF DEICING SYSTEM".

BACKGROUND

The present disclosure relates to a boom for dispensing a deicing/snow removal solution onto snow and/or ice on a surface. More particularly, the present disclosure relates to a modular boom that is shipped dissembled that is configured to be assembled and attach to a prime mover and dispense a deicing/snow removal solution onto snow and/or ice on runways, roads, parking lots and walkways.

Many people use rock salt to remove snow and ice from runways, roads, parking lots and walkways and the like. However, rock salt has many drawbacks including the fact that the snow and/or ice needs to start melting prior to the rock salt beginning to work. If the temperatures are sufficiently cold, the snow and/or ice may not begin to melt, which renders the rock salt ineffective until the weather warms. As such, there are many instances that rock salt is ineffective in removing snow and/or ice.

Further, rock salt is commonly spread on surfaces with sand, which is used for traction. The rock salt and sand collect in shoes and creates messes in establishments. Cleaning the establishments of rock salt and sand adds to the janitorial costs of maintaining the cleanliness of establishments.

Instead of using rock salt and sand, others pretreat surfaces with a brine solution prior to a pending snowstorm. When the application is timed correctly, the brine prevents snow and ice from sticking to the runways, roads, parking lots and walkways, which makes snow removal more efficient, both in time and cost. However, if the precipitation falls in the form of rain prior to snowing, the brine can be washed from the surface and rendered ineffective. Further, if the temperature drops below the freezing temperature of the brine prior to the snow falling, the brine is also rendered ineffective.

Instead of using rock salt and sand or pretreating a surface with brine, it has been found that the brine can be applied after a snow, typically after the surface has been plowed or snow-blown. However, the post treatment with brine can be utilized without having prior snow removal. Post treating the surface with slightly more liquid deicing solution than used to pretreat the surface, such as 10 to 15% by volume relative to pretreating, effectively removes snow and deices the surface without the need for pretreating. Using only post snow treatment eliminates the cost of pretreatment and the wear on equipment caused by the need for at least two passes per snow event.

It has been determined that brine works three to four times faster than rock salt and is more ecofriendly than rock salt. Because of the effectiveness of brine, less chlorides reach the storm water system. Further, the use of brine significantly lessens the damage to concrete and asphalt surfaces relative to rock salt. While not being bound to theory, it is believed that brine reduces the number of freeze/thaw cycles relative to rock salt, that can be destructive to concrete and asphalt. As such, the use of brine as a pretreatment and after a snow event are beneficial to the surface being treated and the environment relative to the use of rock salt.

SUMMARY

An aspect of the present disclosure relates to a modular boom for attaching to a prime mover and dispensing a solution to remove snow and deice a surface. The modular boom includes a substantially central bracket having an internal cavity and a boom shroud. The boom shroud includes a first boom shroud section having a first main body and a first opening proximate a bottom and a first interior cavity accessible through the opening. The first boom shroud section has a first end portion configured to be positioned and retained within the internal cavity of the central bracket and a second end portion extending from the central cavity. The boom shroud includes a second boom shroud section having a second main body and a second opening proximate a bottom and a second interior cavity accessible through the opening. The second boom shroud section has a first end portion configured to be positioned and retained within the internal cavity of the central bracket and a second end extending from the central cavity. The modular boom includes a boom pipe having a first boom pipe section having a length between first and second ends and spaced apart apertures along the length, and a second boom pipe section having a length between first and second and spaced apart apertures along the length wherein the first and second boom pipe sections are configured to be fluidly coupled proximate the first ends and proximate the substantially central bracket. The modular boom includes a first end cap configured to support the second end portion of the first boom shroud and the second end of the first boom pipe portion, wherein when connected the first end cap, the first boom shroud and the first boom pipe portion provide structural rigidity to the modular boom. The modular boom includes a second end cap configured to support the second end portion of the second boom shroud and the second end of the second boom pipe portion, wherein when connected the second end cap, the second boom shroud and the second boom pipe portion provide structural rigidity to the modular boom.

Another aspect of the present disclosure relates to a modular boom for attaching to a prime mover and dispensing a solution to remove snow and deice a surface. The modular boom includes a boom shroud comprising a main body extending from a first end to a second end. The main body of the boom shroud has a substantially wedge shaped portion with an edge configured to engage a snow pile or windrow of snow and cause snow to flow about the wedge shaped portion. The boom shroud has an opening in a bottom of the main body to provide access to an interior cavity. The modular boom includes a boom pipe positioned within the interior cavity of the boom shroud and having ends that extend beyond the boom shroud. The boom pipe having spaced apart apertures along the length configured to dispense the solution onto the surface. The modular boom also includes first and second end caps configured to support the end of the boom pipe and to connect to the first and second ends of the boom shroud to provide structural rigidity to the modular boom.

Another aspect of the present disclosure relates to a modular boom for attaching to a prime mover, the modular boom is configured to dispense a solution to remove snow and ice from a surface. The modular boom includes a boom shroud comprising a main body extending from a first end to a second end. The main body of the boom shroud has a substantially wedge shaped portion with an edge configured to engage a snow pile or windrow of snow and cause snow to flow about the wedge shaped portion and an opening in a bottom of the main body providing access to an interior cavity. The modular boom includes a boom pipe positioned within the interior cavity of the boom shroud and having ends that extend beyond the boom shroud, the boom pipe having spaced apart apertures along the length configured to dispense brine onto the surface. The modular boom also includes first and second end caps configured to support the end of the boom pipe and to connect to the first and second ends of the boom shroud to provide structural rigidity to the modular boom. The modular boom includes a plurality of nozzles retained to each of the first and second end caps, wherein each nozzle of the plurality of nozzles in each end cap has a different spray profile wherein each nozzle of the plurality of nozzles includes an annular groove configured to accept a camming mechanism of a connector to secure the connector to the nozzle.

DETAILED DESCRIPTION OF ILLUSTRATIVE EMBODIMENTS

Figure 1:
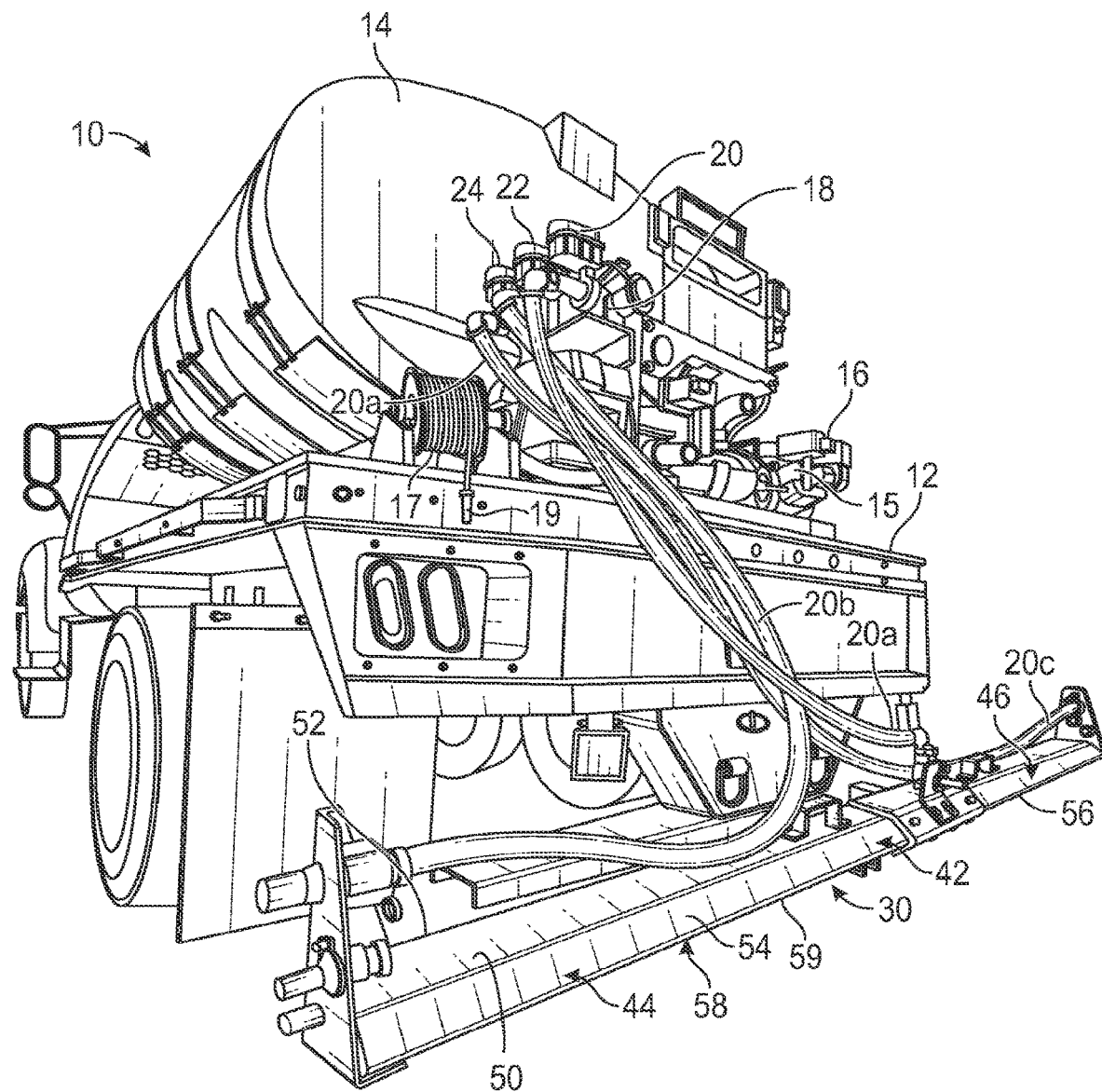
FIG. 1 is a perspective view a modular deicing boom attached to a prime mover.
Figure 2:
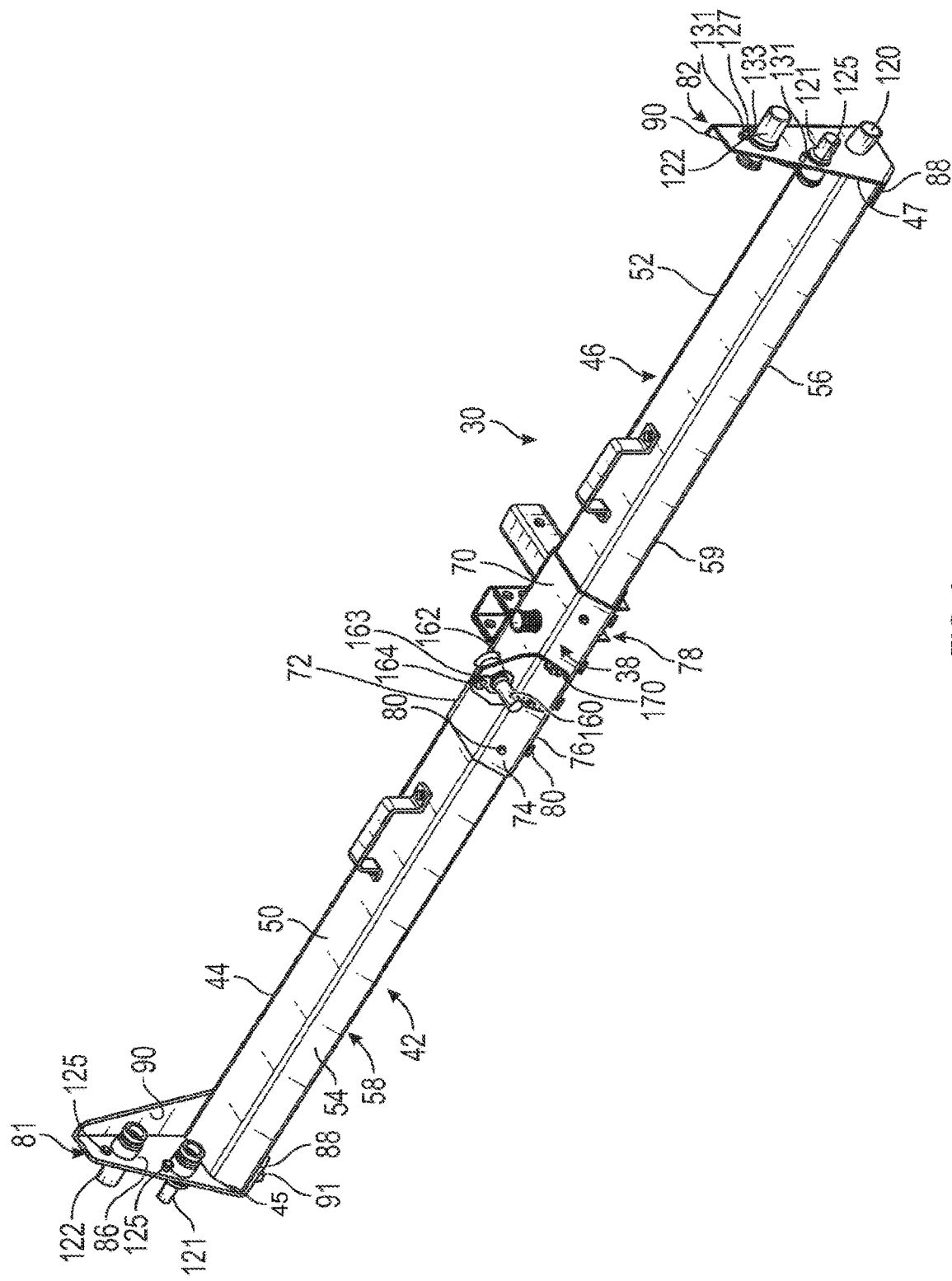
FIG. 2 is a perspective view of the modular deicing boom.
Figure 3:
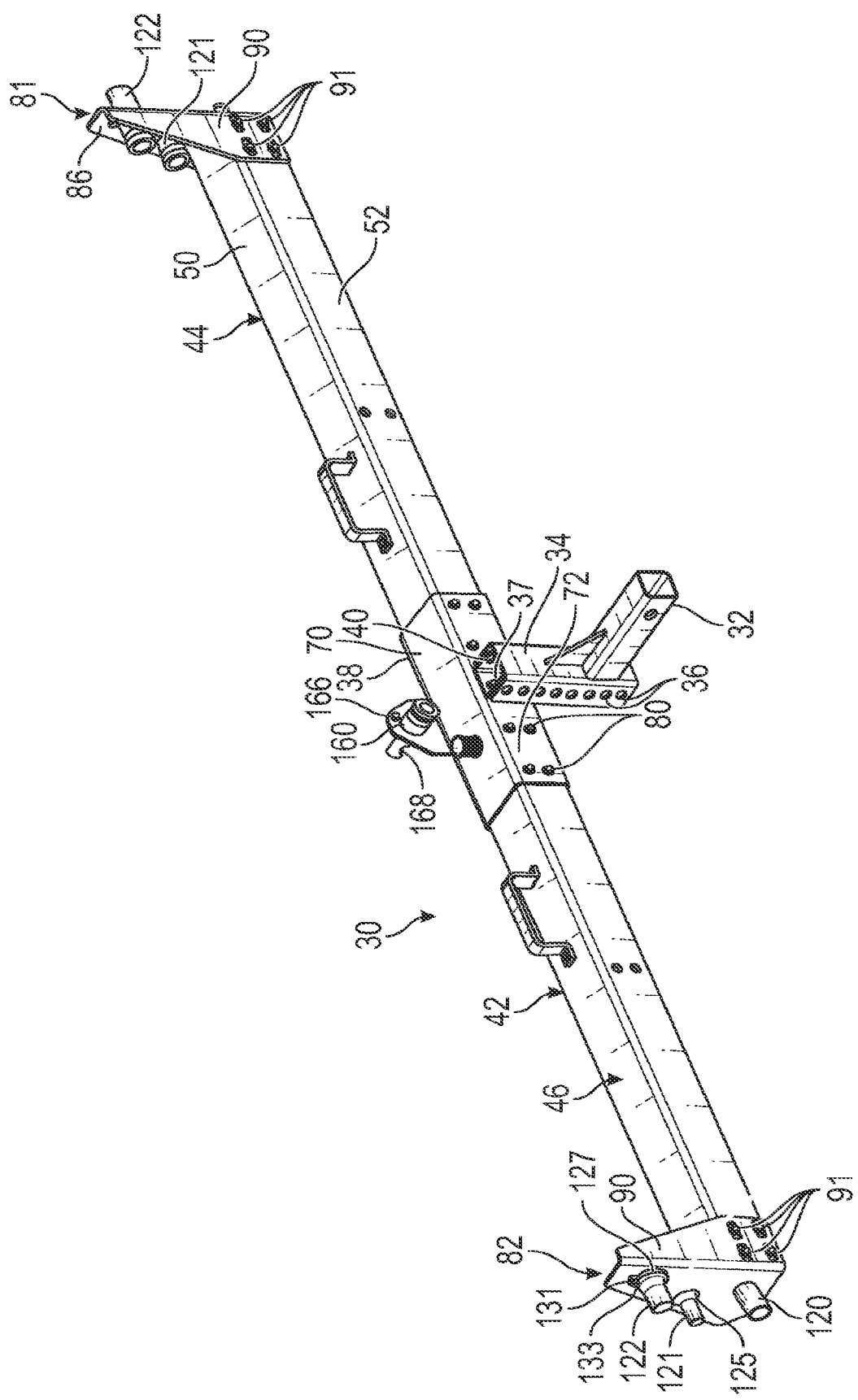
FIG. 3 is another perspective view of the modular deicing boom.

A boom for dispensing deicing solution and being mounted to a prime mover 10 is illustrated in FIG. 1 at 30. The boom 30 is modular and shipped disassembled, which results in compact, less expensive shipping and is assembled using bolts and nuts, making assembly efficient and straight forward. While bolts and nuts are typical connecting mechanisms, other connecting mechanisms are also within the scope of the present disclosure.

The boom 30 is used to dispense a brine solution of salt (NaCl) and/or salt (NaCl) mixed with another salt, typically a divalent salt such as, but not limited to, calcium chloride ($CaCl_2$), where other salt is added to reduce or depress the freezing point of the brine solution based upon the ambient temperature. The boom 30 is used to dispense the brine to remove snow and/or ice from a surface, such as runways, streets, parking lots and walkways at temperatures well be 0° F., where rock salt is ineffective. The boom can also be used to pretreat a surface with brine prior to a snowfall.

While brine solutions are described herein, the boom of the present disclosure can be used with any liquid and for purposes besides melting snow and ice and/pretreating a surface. It is within the scope of the present disclosure that a solution without chloride ions could be utilized to pretreat surfaces prior to a snowfall or to remove snow and ice after a snowfall.

The illustrated prime mover 10 includes a bed 12 that supports a brine tank 14 and a pump 16 that is fluidly coupled to the brine tank 14 with a hose 15. The pump 16 discharges into a manifold 18 that controls the flow of brine to a boom pipe and one or more nozzles extending from opposing end caps or a nozzle substantially centrally located on the boom using a plurality of control valves 20, 22, and 24 that are fluidly coupled to the one or more nozzles with hoses 20 *a*, 22*a* and 24*a*, respectively. The control valves 20, 22 and 24 allow an operator to direct the brine solution to selected brine dispensers to remove snow and ice. In some instances, the operator may desire to remove snow and ice manually, at which time a retractable hose 17 with a sprayer 19 may be utilized to deliver the brine solution to the selected area.

As illustrated the boom 30 is sized to be used with a commercial driver's license (CDL) sized truck where the boom is about 100 inches in length. The length of the boom can be varied to accommodate different vehicles. By way of example, an 84-inch boom is typically utilized with a pickup truck and a 48-inch boom is utilized with a UTV. The sizes of the modular booms discussed herein are exemplary and non-limiting in nature, and the size of the modular boom 30 can be selected to accommodate any vehicle.

Referring to FIGS. 1-5, the boom 30 is illustrated being mounted to a hitch receiver on the prime mover 10 by securing a draw bar 32 attached to the boom 30 within the hitch receiver. The draw bar 32 includes a first U-shaped mounting bracket 34 with a plurality of aligned apertures 36 that are configured to align with apertures in a second U-shaped mounting bracket 37 having a plurality of aligned apertures 40, where the second U-shaped mounting bracket 37 is secured to a central bracket 38 of the boom 30. The boom 30 can be adjusted to a selected height relative to the surface to accommodate different snow depths. The boom 30 is secured at the selected height with bolts or pins being inserted through the aligned apertures 36 and 40. In other instances, when a hitch is unavailable, the boom 30 can be directly mounted to the prime mover 10.

Referring to FIGS. 1-5, the modular boom 30 includes a boom shroud 42 that includes a left section 44 and a right section 46 that are substantially mirror images of each other. The left section 44 and the right section 46 of the boom shroud 42 are typically formed from sheet metal. However, other materials of construction are also contemplated.

The left and right sections 44 and 46 have a substantially horizontal upper portion 50 and a front portion 52 extending is substantially normal to the substantially horizontal upper portion 50. A top, downwardly sloped surface 54 extends from the horizontal upper portion at an obtuse angle. A bottom sloped surface 56 extends from the top sloped surface 54 in an acute angle and toward the upper portion 50 to form a wedge-shaped back portion 58.

The wedge portion 58 has a sharp bend 59 along the length of both the left and right sections 44 and 46 that provides a point of contact with a pile of snow or a windrow. With the point of contact with the snow being the bend 59, as the prime mover 10 is moved in reverse, the wedge portion 58 allows snow to flow over and under the boom shroud 42 which disperses the force as the boom 30 is moved through the pile of snow or windrow while maintaining the structural integrity of the boom 30.

The central bracket 38 is has a complementary cross-sectional configuration to that of the left and right sections 44 and 46 such that inner portions 60 of the left and right sections can be positioned therein. The central bracket 38 has a substantially horizontal top portion 70 and a front portion 72 extending therefrom that is substantially normal to the substantially horizontal top portion 70. The central bracket 38 includes a wedge-shaped back portion 78 that is formed by a top, downwardly sloped surface 74 extending from the top portion 70 at an obtuse angle and a bottom, sloped surface that extends from the sloped surface 74 at an acute angle towards the top portion 70.

The inner portion 60 of each section 44 and 46 has a plurality of apertures located in the front portion 52, the top downwardly sloped surface 54 and the bottom sloped surface 56 that align with apertures in the front portion 72, the top, downwardly sloped surface 74 and the bottom sloped surface 76. Bolts 80 are inserted through the aligned apertures and nuts threadably engage the bolts to secure both inner portions 60 of the left and right sections 44 and 46 of the boom shroud 42. With the bolts secured to the nuts, the central bracket 38 provides rigidity and support to the boom shroud 42, where the length of overlap between the inner portions 60 and the central bracket 38 resists moment forces and torques applied to the boom 30 while in use to maintain positional stability of the boom 30 relative to the prime mover 10 and the surface being treated.

A left end cap 81 is secured proximate an outer end 45 of the left section 44 and a right end cap 82 is secured proximate an outer end 47 of the right section 46. The left and right end caps 81 and 82 are substantially mirror images of each other. Each end cap 81 and 82 includes an end portion 86 that abuts the outer ends 45 and 47 of the left and right sections 44 and 46, respectively, where the end portion 86 extends above the upper portions 50 of the left and right sections 44 and 46. Each end cap 81 and 82 includes a slanted back portion 88 that is substantially at a same angle as that of the bottom sloped surface 56 and a front portion 90 that is substantially normal to the end portion 86. The front portion 90 abuts the front portion 52 of each section 44 and 46 and the slanted back portion 88 abuts the bottom sloped surface 56 of each section 44 and 46. Apertures in the slanted back portions 88 and the bottom sloped surface 56 and apertures in the front portions 90 and 52 align such that bolts 91 can be positioned therethrough and secure the end caps 81 and 82 to the sections 44 and 46 with nuts.

The brine is delivered along the boom shroud 42 with a boom pipe 100 located within an interior cavity 43 of the boom shroud 42. The boom pipe 100 includes left boom pipe section 102 and right boom pipe section 104 where the left and right boom pipe sections 102 and 104 have threaded ends 106 and 108.

Figure 4:
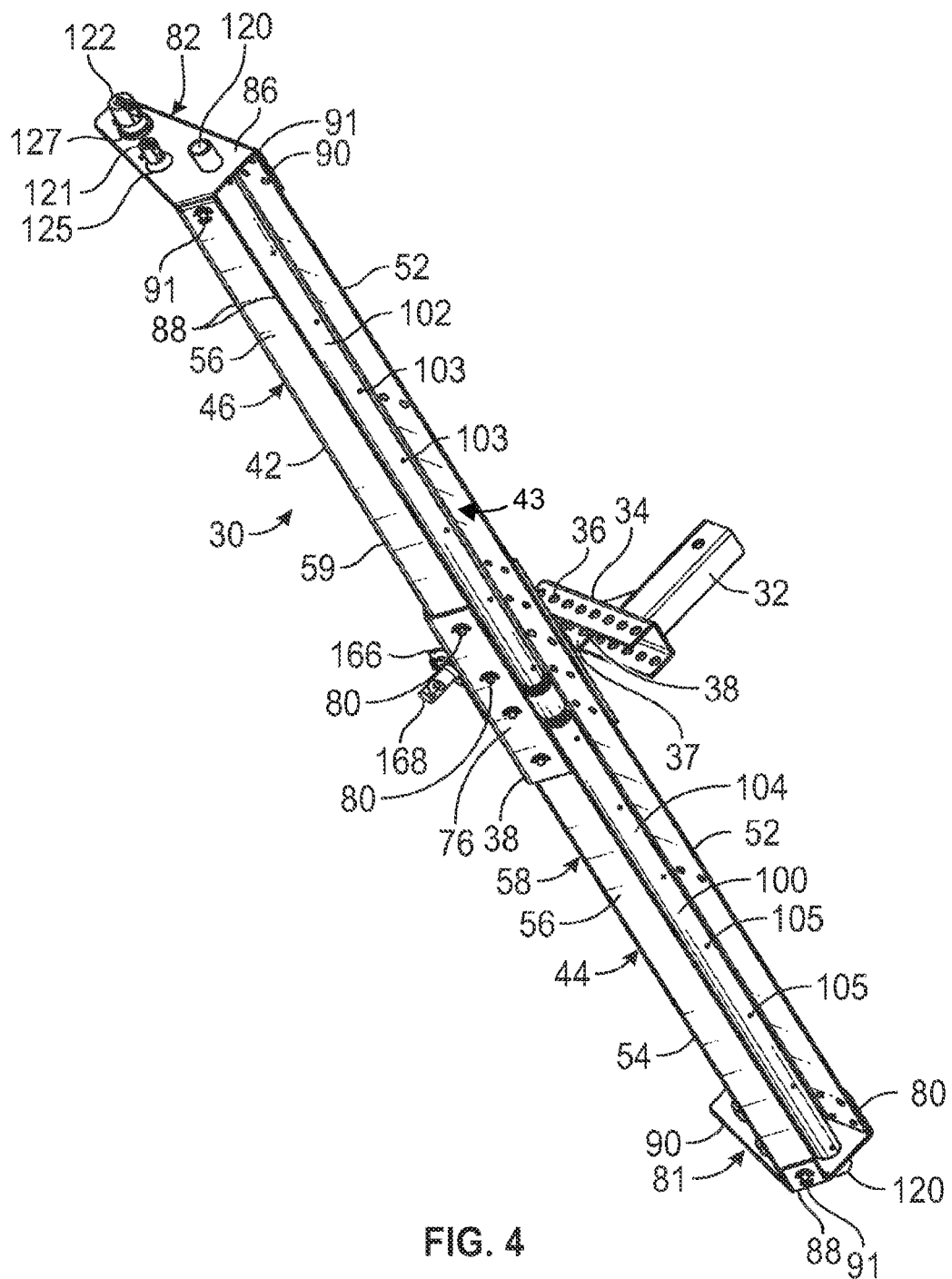
FIG. 4 is another perspective view of the modular deicing boom.
Figure 5:
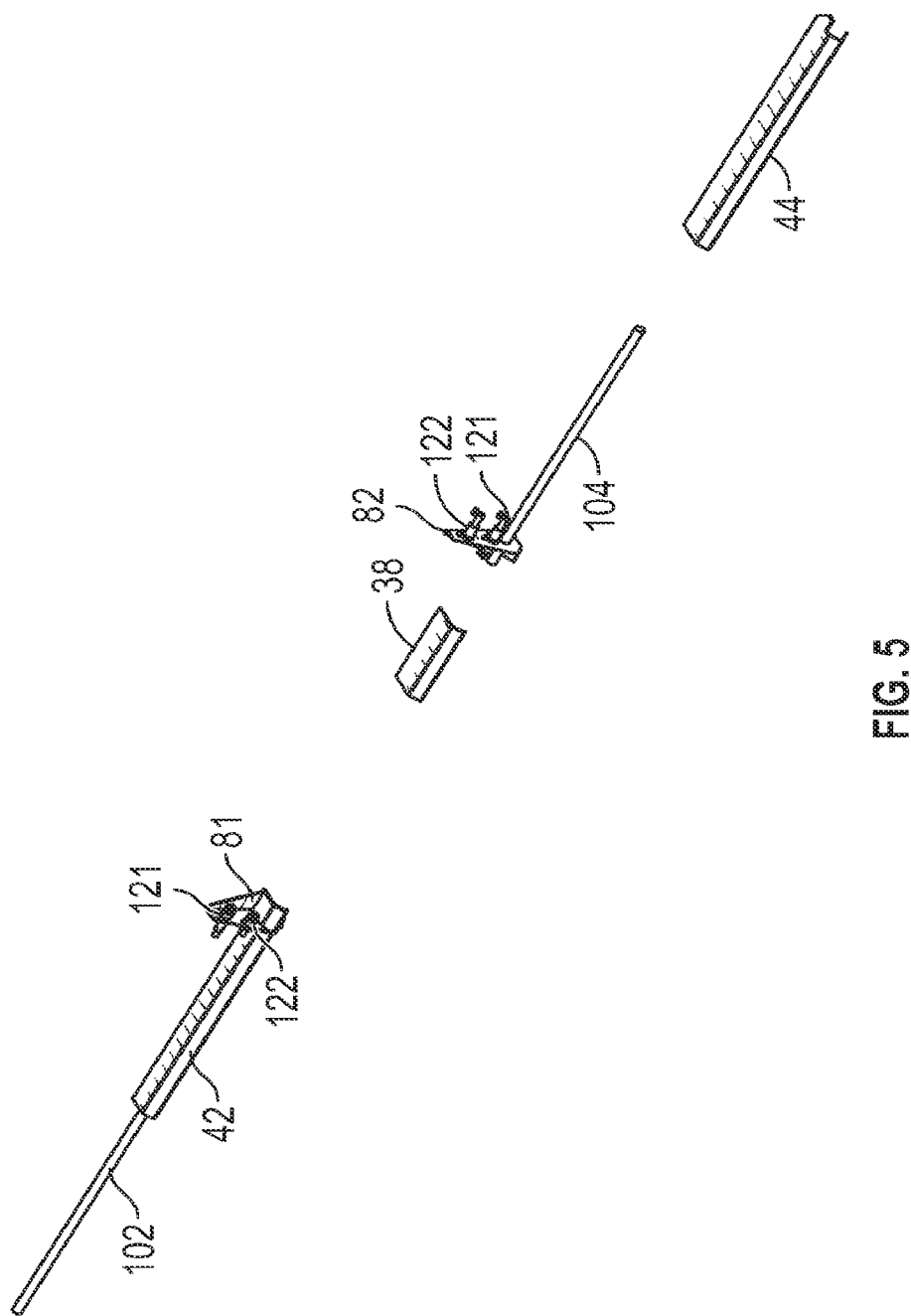
FIG. 5 is an exploded view of the modular deicing boom.
Figure 6:
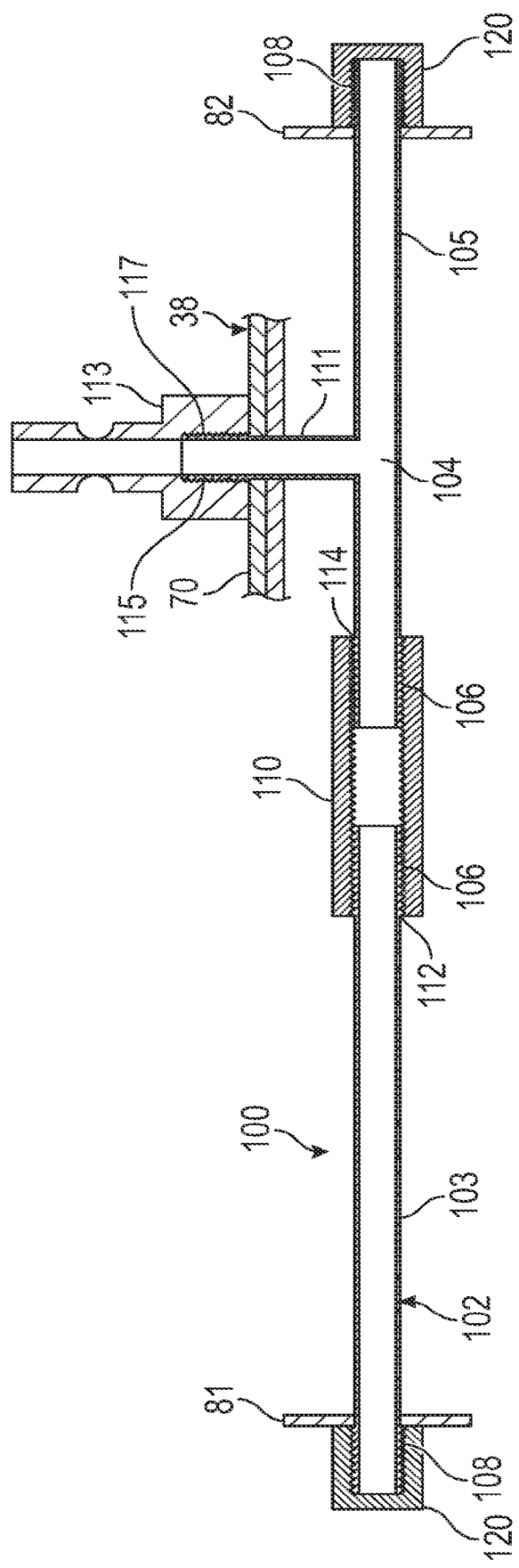
FIG. 6 is a schematic view of the boom pipe of the deicing boom.

Referring to FIGS. 4 and 6, to install the left and right boom pipe sections 102 and 104, the threaded ends 106 are position through apertures in the end caps 81 and 82 and are positioned proximate the central bracket 38. When proximate the central bracket 38, the threaded ends 106 threadably engage opposing threaded bores 112 and 114 in a connector 110. A riser 111 extends from and is fluidly coupled to the pipe section 104. The riser 111 is secured to a central bracket 38 through an aperture in the top portion 70 where a coupling 113 with threaded bore 115 threadably engages threads 117 in the riser 111 located above the central bracket 38 to secure the riser 111 to the central bracket 38. With the ends 106 threadably secured to the connector 110, the ends 108 extend beyond the end caps 81 and 82. A threaded cap 120 is threadably secured to each end 108. With the boom pipe sections 102 and 104 secured to the connector 110 and the end caps 81 and 82, the boom pipe sections 102 and 104 provide structural integrity and rigidity to the boom 30. While threaded caps 120 engaging threaded ends 108 and a threaded coupling 113 engaging a threaded riser 11 is disclosed and illustrated, the present disclosure is not limited to threaded connections. Rather, any suitable connection can be utilized to securely retain the ends and inlet to the boom pipe 100 included, but not limited to, a O-ring style seal, a press fit and welding.

The left and right boom pipe sections 102 and 104 have spaced apart dispensing holes 103 and 105, respectively, along each length that are configured to dispense the brine solution. The use of the dispensing holes 103 and 105 instead of nozzles provides advantages when used in harsh environments. One advantage includes having the dispensing portions of the boom pipe 100 substantially protected by the boom shroud 42. In harsh environments, nozzles extending from the boom pipe have a tendency of being damaged or displaced from the boom pipe, which causes down time for repair.

Additionally, while the boom pipe 100 provides structural integrity, the boom pipe 100 is also sufficiently flexible to bend without breaking, in the event the boom 30 impacts a snow drift or other obstacle. An exemplary, non-limiting material of construction of the boom pipe sections is a 1" schedule 40 stainless steel pipe with holes cut with a laser. The stainless steel pipe is able to withstand the harsh and corrosive environment of a brine solution. However, the boom pipe 100 can be constructed of any suitable material that provides sufficient structural integrity and rigidity for the boom 30 while being able to withstand the corrosive environment of brine.

The end caps 81 and 82 support spaced apart nozzles 121 and 122 that are positioned through apertures in the end portions 86, where the nozzles 121 and 122 have different spray profiles. The nozzles 121 and 122 are inserted through the apertures and toward the central bracket 38 until a shoulder 125 and 127, respectively, engage the end portions 86 of the end caps 81 and 82. Each nozzle includes a tab 131 with a threaded bore 133 that aligns with an aperture in the end portions 86. To maintain the orientation of the spray profiles, threaded bolts 125 are positioned through the apertures and threadably engage the threaded bore 133. Positioning and threadably retaining the bolts 125 to the threaded bores 133 fixes the rotational orientation of the nozzles 121 and 122 to ensure that the spray profile is properly oriented for effective treatment.

The boom 30 includes a substantially centrally located nozzle 160 extending from a bracket 170 attached to the central bracket 38 with the bolts. The nozzle 160 includes a shoulder 162 that abuts the bracket 170 and where the nozzle 160 includes a tab 163 with a threaded bore 164 that aligns with an aperture in the bracket 170. A threaded bolt 166 is positioned through the aperture and threadably engages the threaded bore 164 to fix the rotational orientation of the nozzle 160. The nozzle 160 has an opening 168 that creates a fan spray profile that spans the length of the boom where the nozzle 160 is typically used to pretreat a surface.

Figure 7:
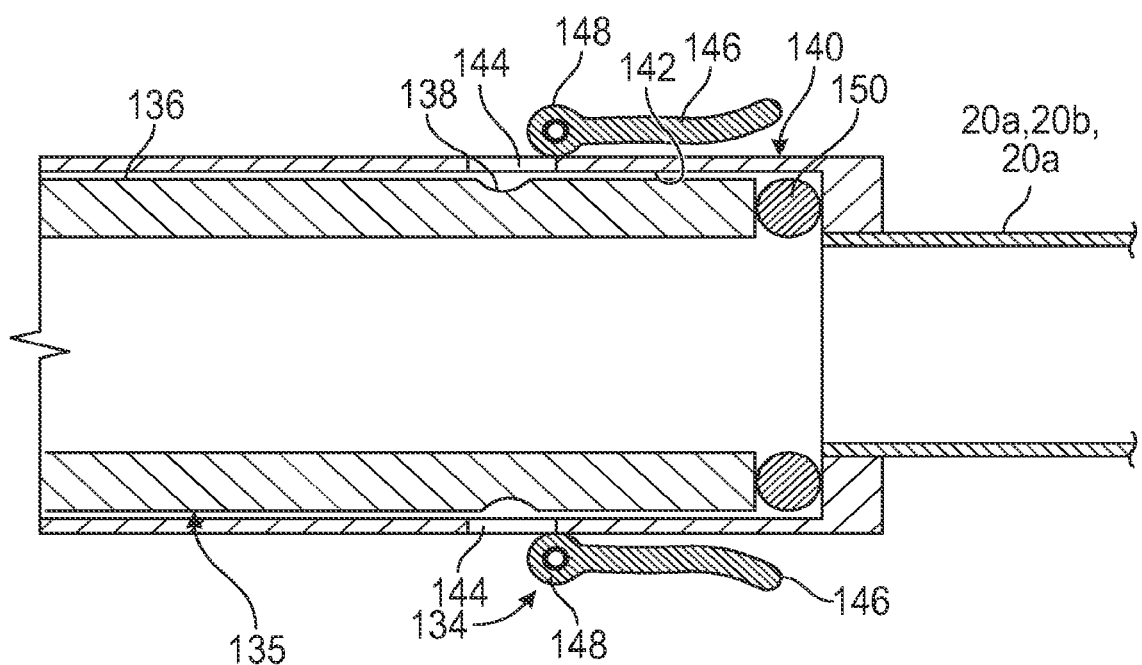
FIG. 7 is a sectional view of a camming coupler in a first unlocked position.
Figure 8:
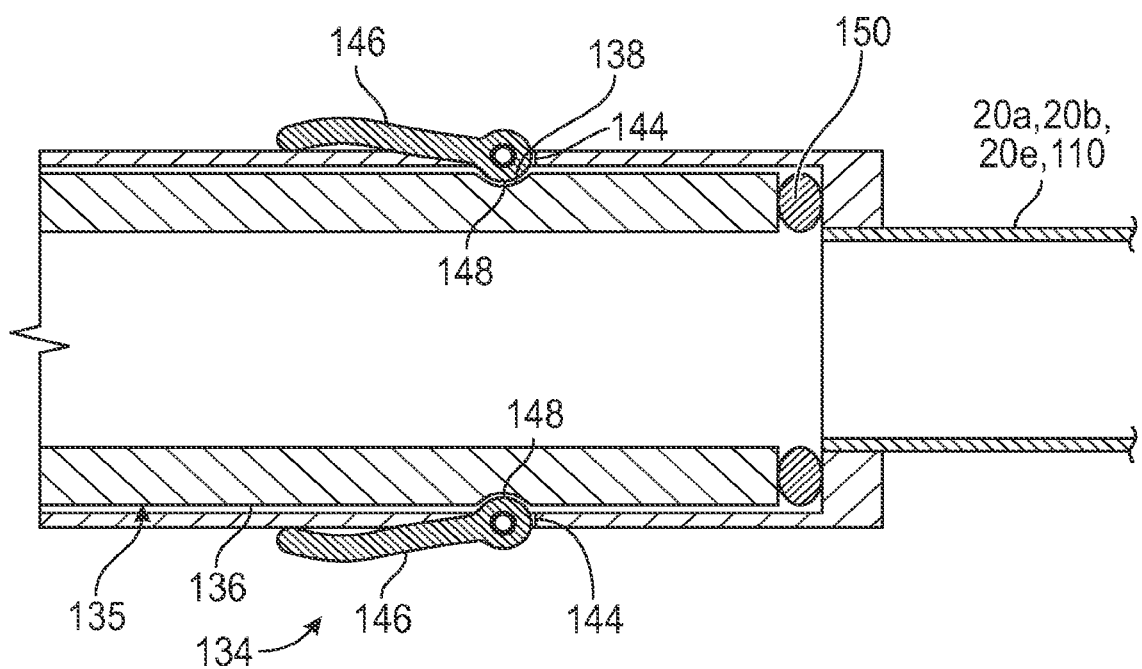
FIG. 8 is a sectional view of the camming coupler is a second locked position.

Referring to FIGS. 7 and 8, each of the nozzles 121, 122 and 160 and the portion of the coupling 113 have a first portion 135 of a coupler 134 attached thereto. The first portion 135 includes a substantially cylindrical outer surface 136 with an annular groove 138.

Each hose 20a, 20b and 20c extending from the control valves 20, 22, and 24 is equipped with a second portion 140 of the coupler 134. The second portion 140 of the coupler 134 includes a substantially cylindrical inner surface 142 having opposing openings 144 and pivotally attached locking members 146 with camming surfaces 148.

When the locking members 146 are in a first, unlocked position, the camming surface 148 is displaced from the inner surface and the second portion 140 of the coupler 134 is positioned over the first portion 135 until an O-ring 150 in the second portion 140 abuts an end of the first portion 135 and the annular groove 138 aligns with the openings 144. With the openings 144 aligned with the annular groove 138, the locking members 146 are pivoted to force the camming surface 148 through the openings 144 and into the annular groove 138 which locks the first and second portions 135 and 140 of the coupler 134 together and forms a seal with the O-ring 150. To disconnect the second portion 140 from the first portion 135, the locking members 146 are rotated in an opposite direction to displace the camming surface 148 from the annular groove 138, which allows manual force to be used to remove the second portion 140 from the first portion 135.

In operation, the hose 20a is secured to the connector 113 to provide a source of brine to the boom pipe 100. The hoses 20b and 20c are attached to either the nozzles 121 or 122, depending upon the desired spray profile. The prime mover 10 is moved over the surface, typically in a forward direction, while dispensing brine from the boom pipe 100, and optionally the nozzles 121 or 122. The dispersed brine melts the snow and ice from the surface.

When encountering a pile of snow or a windrow of snow that is as high as the boom 30, the operator places the prime mover 10 in reverse such that the edge 59 of the wedge shaped portion 58 makes contact with the snow and causes the snow to flow over and under the boom 30, while the boom pipe 30 and/or nozzles 121 and 122 are dispensing brine. The brine causes the snow and ice to melt such that the surface is substantially cleared of snow and ice.

Although the present invention has been described with reference to preferred embodiments, workers skilled in the art will recognize that changes may be made in form and detail without departing from the spirit and scope of the invention.

What is claimed:

1. A modular boom for attaching to a prime mover and dispensing a solution to remove snow and deice a surface, the modular boom comprising:
   a substantially central bracket having an internal cavity;
   a boom shroud including a first boom shroud section and a second boom shroud section,
   each of the first and second boom shroud sections partially received in the internal cavity of the substantially central bracket and having
   a substantially horizontal upper portion,
   a front portion extending substantially normal to, and downwardly from, the substantially horizontal upper portion,
   a top, downwardly sloped surface extending downwardly from the substantially horizontal upper portion and outwardly from the substantially horizontal upper portion relative to the front portion, and
   a bottom sloped surface extending downwardly from the top, downwardly sloped surface and inwardly from the top, downwardly sloped surface, in a direction toward the front portion, the top, downwardly sloped surface and the bottom sloped surface together defining a wedge-shaped back portion extending along the boom shroud;
   a first end cap disposed on an end of the first boom shroud section opposite the substantially central bracket;
   a second end cap disposed on an end of the second boom shroud section opposite the substantially central bracket; and
   a boom pipe secured within the boom shroud, the boom pipe having spaced apart apertures along a length thereof, configured to dispense brine along the surface.

2. The modular boom of claim 1, each of the first end cap and the second end cap including an aperture through which an end of the boom pipe extends.

3. The modular boom of claim 2, each of a first portion of the boom pipe extending beyond the first boom shroud section through the aperture of the first end cap and a second portion of the boom pipe extending beyond the second boom shroud section through the aperture of the second end cap being threaded, and wherein the boom pipe is secured within the boom shroud by first and second threaded caps received, respectively, on the threaded first and second portions of the boom pipe.

4. The modular boom of claim 1, further comprising a substantially centrally located nozzle extending from a bracket attached to the substantially central bracket.

5. The modular boom of claim 4, wherein the bracket attached to the substantially central bracket includes an aperture therethrough, the nozzle includes a threaded bore aligned with the aperture in the bracket, a threaded bolt is threadably engaged with the threaded bore to fix the rotational orientation of the substantially centrally located nozzle.

6. The modular boom of claim 4, wherein the nozzle includes an opening that, when a brine solution is introduced through the nozzle, produces a fan spray profile that spans a length of the modular boom.

7. The modular boom of claim 4, wherein the nozzle is in selective fluid communication, through a hose, with a source of brine fluid, one of the nozzle and an end of the hose opposite the source of brine fluid having a first portion of a coupler including a substantially cylindrical outer surface having an annular groove, and the other of the nozzle and the end of the hose opposite the source of brine fluid having a second portion of the coupler including a substantially cylindrical inner surface, the substantially cylindrical inner surface of the second portion of the coupler having a greater diameter than the substantially cylindrical outer surface of the first portion of the coupler so as to accommodate the first portion of the coupler therein, the second portion of the coupler having opposing openings therein that, when the first portion of the coupler is received in the second portion of the coupler, are axially aligned with the annular groove.

8. The modular boom of claim 7, wherein each of the opposing openings of the second portion of the coupler has associated therewith a locking member having a camming surface, each of the locking members actuatable between a first, unlocked position in which the camming surface is displaced from the inner surface, and a second, locked position in which the camming surface extends through the respective opening in the second portion of the coupler and into the annular groove.

9. The modular boom of claim 8, further comprising an O-ring between a first end of the second portion and an end of the first portion of the coupler, the O-ring contributing to form a seal between the first and second portions of the coupler when both of the locking members are in their second, locked position.

10. The modular boom of claim 1, wherein each of the first end cap and the second end cap includes at least one nozzle-receiving aperture, and a respective nozzle received in each of the nozzle-receiving apertures.

11. The modular boom of claim 10, wherein at least one of the first end cap and the second end cap includes at least two of the nozzle-receiving apertures, each of which includes one of the nozzles, the nozzle received in a first of the nozzle-receiving apertures having a different spray profile than another of the nozzles received in the same end cap.

12. The modular boom of claim 10, wherein at least one of the nozzles is in selective fluid communication, through a respective hose, with a source of brine fluid, one of the at least one nozzles and an end of the respective hose opposite the source of brine fluid having a first portion of a coupler including a substantially cylindrical outer surface having an annular groove, and the other of the nozzle and the end of the respective hose opposite the source of brine fluid having a second portion of the coupler including a substantially cylindrical inner surface, the substantially cylindrical inner surface of the second portion of the coupler having a greater diameter than the substantially cylindrical outer surface of the first portion of the coupler so as to accommodate the first portion of the coupler therein, the second portion of the coupler having opposing openings therein that, when the first portion of the coupler is received in the second portion of the coupler, are axially aligned with the annular groove.

13. The modular boom of claim 12, wherein each of the opposing openings of the second portion of the coupler has associated therewith a locking member having a camming surface, each of the locking members actuatable between a first, unlocked position in which the camming surface is displaced from the inner surface, and a second, locked position in which the camming surface extends through the respective opening in the second portion of the coupler and into the annular groove.

14. The modular boom of claim 13, further comprising an O-ring between a first end of the second portion and an end of the first portion of the coupler, the O-ring contributing to form a seal between the first and second portions of the coupler when both of the locking members are in their second, locked position.

15. A method for mounting a modular boom to a prime mover, comprising:
mounting a modular boom to a hitch receiver of a prime mover by
selecting a height at which to mount the modular boom relative to a surface on which the prime mover is to be operated, based on a depth of snow on the surface;
securing a draw bar attached to the modular boom within the hitch receiver by aligning apertures of a first U-shaped mounting bracket associated with the draw bar and apertures of a second U-shaped mounting bracket associated with the modular boom such that the modular boom is at the selected height, and inserting a fastener through the aligned apertures, and in mounting the modular boom to the hitch receiver, the modular boom comprises
a substantially central bracket having an internal cavity;
a boom shroud including a first boom shroud section and a second boom shroud section,
each of the first and second boom shroud sections partially received in the internal cavity of the substantially central bracket and having
a substantially horizontal upper portion,
a front portion extending substantially normal to, and downwardly from, the substantially horizontal upper portion,
a top, downwardly sloped surface extending downwardly from the substantially horizontal upper portion and outwardly from the substantially horizontal upper portion relative to the front portion, and
a bottom sloped surface extending downwardly from the top, downwardly sloped surface and inwardly from the top, downwardly sloped surface, in a direction toward the front portion, the top, downwardly sloped surface and the bottom sloped surface together defining a wedge-shaped back portion extending along the boom shroud;
a first end cap disposed on an end of the first boom shroud section opposite the substantially central bracket;
a second end cap disposed on an end of the second boom shroud section opposite the substantially central bracket; and
a boom pipe secured within the boom shroud, the boom pipe having spaced apart apertures along a length thereof, configured to dispense brine along the surface.

16. A method for operating a prime mover having a modular boom secured thereto, comprising:
selecting a spray profile from among a plurality of different spray profiles;
connecting a hose from a source of brine fluid mounted on the prime mover to a nozzle arranged on a modular boom, to deliver the selected spray profile rather than to a different nozzle arranged to deliver a spray profile different from the selected spray profile; the modular boom comprising
a substantially central bracket having an internal cavity;
a boom shroud including a first boom shroud section and a second boom shroud section, each of the first and second boom shroud sections partially received in the internal cavity of the substantially central bracket and having
a substantially horizontal upper portion,
a front portion extending substantially normal to, and downwardly from, the substantially horizontal upper portion,
a top, downwardly sloped surface extending downwardly from the substantially horizontal upper portion and outwardly from the substantially horizontal upper portion relative to the front portion, and
a bottom sloped surface extending downwardly from the top, downwardly sloped surface and inwardly from the top, downwardly sloped surface, in a direction toward the front portion, the top, downwardly sloped surface and the bottom sloped surface together defining a wedge-shaped back portion extending along the boom shroud;
a first end cap disposed on an end of the first boom shroud section opposite the substantially central bracket;
a second end cap disposed on an end of the second boom shroud section opposite the substantially central bracket;
a boom pipe secured within the boom shroud, the boom pipe having spaced apart apertures along a length thereof, configured to dispense brine along a surface on which the prime mover is operated;
the nozzle on the modular boom being any of a substantially centrally located nozzle extending from a bracket attached to the substantially central bracket; and at least one of a plurality of end cap nozzles, each of the end cap nozzles received in a respective nozzle-receiving aperture in each of the first end cap and the second end cap.

17. The method of claim 16, wherein when encountering a depth of snow at least as high as the modular boom, operating the prime mover in a reverse direction such that an edge of the wedge-shaped back portion makes contact with the snow and diverts the snow over and under the modular boom, and delivering the brine fluid through the hose to dispense the brine fluid through one of the nozzles.

\* \* \* \* \*